United States Patent [19]

Gold

[11] 4,078,914
[45] Mar. 14, 1978

[54] GASIFICATION OF COAL AND REFUSE IN A VERTICAL SHAFT FURNACE

[76] Inventor: Louis Gold, 2725 39th St., NW., Washington, D.C. 20007

[21] Appl. No.: 600,688

[22] Filed: Jul. 31, 1975

Related U.S. Application Data

[63] Continuation-in-part of Ser. No. 355,400, May 30, 1973, abandoned.

[51] Int. Cl.$^2$ .............................................. C10J 3/08
[52] U.S. Cl. .......................................... 75/42; 48/210
[58] Field of Search .................. 75/41, 42; 48/197 R, 48/197 A, 209, 210; 423/658

[56] References Cited

U.S. PATENT DOCUMENTS

| 3,729,298 | 4/1973 | Anderson | 75/44 S |
|---|---|---|---|
| 3,830,636 | 8/1974 | Marsh | 44/1 D |
| 3,850,588 | 11/1974 | White | 48/210 |
| 3,909,446 | 9/1975 | Miyashita et al. | 75/41 |

FOREIGN PATENT DOCUMENTS

| 226,500 | 8/1925 | United Kingdom | 423/658 |
|---|---|---|---|
| 1,396,205 | 6/1975 | United Kingdom | 75/5 |

Primary Examiner—M. J. Andrews
Attorney, Agent, or Firm—Sughrue, Rothwell, Mion, Zinn and Macpeak

[57] ABSTRACT

The combustion of refuse, including all types of trash and garbage, in the presence of coal and/or coke and a fluxing agent in a vertical shaft furnace provides for the clean combustion of the refuse, the recovery of metallic wastes and the enhanced production of a gaseous fuel. By blending the refuse with the coal and/or coke and fluxing agent in a coal reaction, a fairly even distribution of the refuse will be achieved to prevent the compaction of the refuse and clogging of the furnace and to provide a more uniform controllable combustion temperature within the furnace thereby prolonging the life of the furnace lining. By using a conventional blast furnace, iron ore and/or scrap metal can also be added to the feed stock for the production of pig iron and the steam generated as a result of the high moisture content of the refuse can be utilized to react with the nascent pig iron within the furnace for the production of hydrogen to enrich the blast furnace gas to provide a high quality fuel gas. The refuse can be added directly to the furnace or be subjected to a preheating operation to reduce the moisture content and volume of the refuse. The steam generated in the pretreatment can be directed into the furnace to cause an enrichment of the furnace effluent gas or be utilized directly for heating or power generation.

3 Claims, 1 Drawing Figure

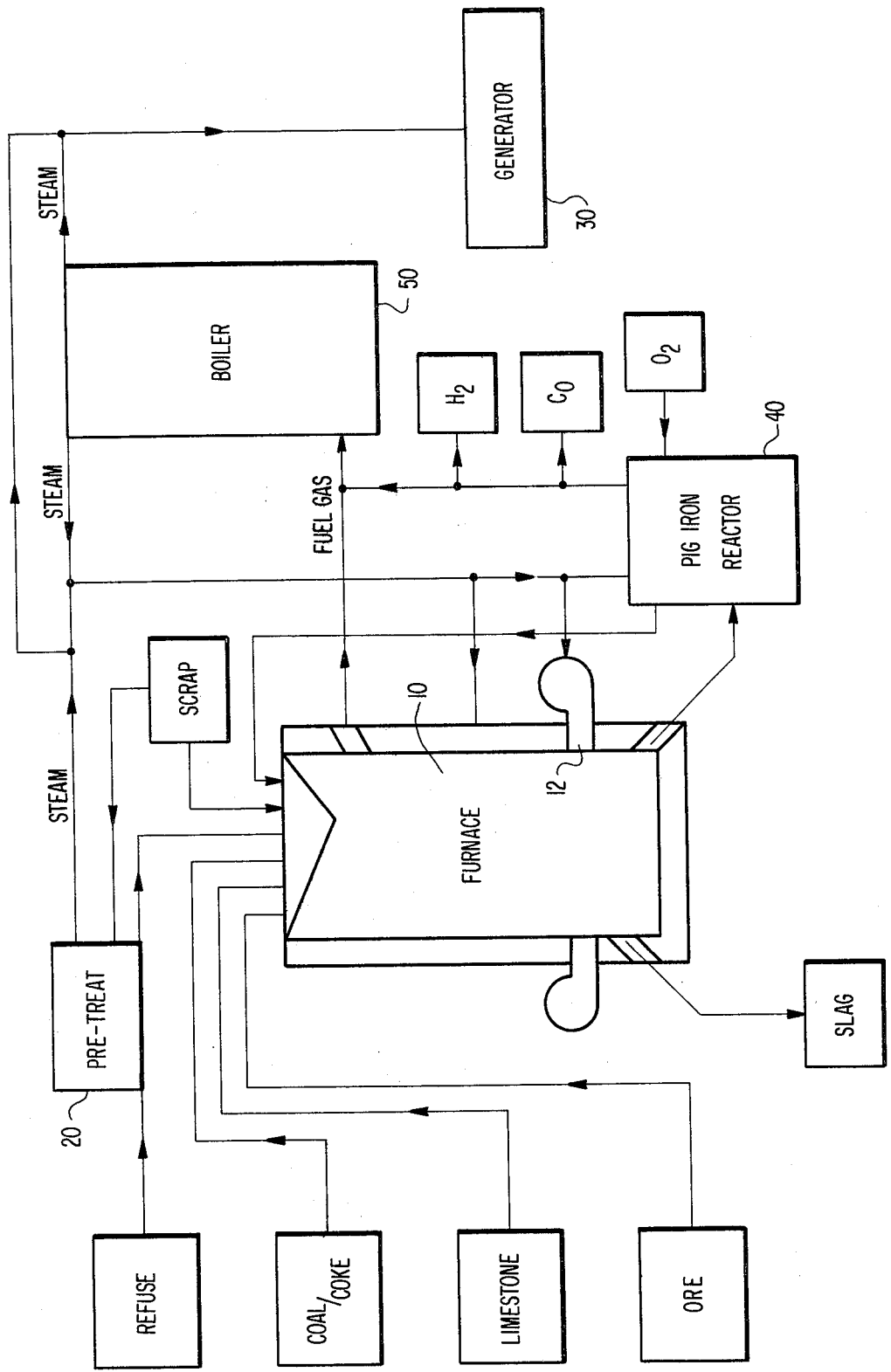

GASIFICATION OF COAL AND REFUSE IN A VERTICAL SHAFT FURNACE

CROSS REFERENCE TO RELATED APPLICATIONS

This application is a continuation-in-part of application Serial No. 355,400, filed May 30, 1973 and now abandoned entitled "Clean Energy Sources From Efficient Conversion of Coal and Related Fossil Fuels: etc." This application is related to application Ser. No. 572,769, filed Apr. 29, 1975 entitled "Coal Reactor, now U.S. Pat. 4,004,845 granted January 25, 1977 and application Ser. No. 590,743, filed June 26, 1975 now U.S. Pat. 3,985,520 granted Oct. 12, 1976 entitled "Gasification Process and Apparatus". The latter two applications are also continuation-in-part applications of application Ser. No. 355,400.

BACKGROUND OF THE INVENTION

1. Field of the Invention

The present invention is directed to the combustion of refuse and more specifically to the combustion of municipal refuse in combination with coal products and a fluxing agent in a blast furnace type environment.

2. Prior Art

The blast furnace art is old and well known and generally consists of adding a charge of coke, limestone and iron ore in predetermined quantities to the top of the blast furnace. A hot blast of air in introduced through a plurality of tuyeres spaced about the circumference of the furnace at the combustion zone and as the burden moves downwardly through the furnace, the combustion of the coke will melt the ore and limestone. The molten pig iron can be drawn off through a tap at the bottom of the furnace and a molten slag containing ash and other impurities can be drawn off through a higher level tap. It is also known in the blast furnace art that the introduction of oxygen or steam at the tuyere level will enrich the blast furnace gas and that the introduction of steam at the bosh level of the furnace will generate hydrogen to further enrich the blast furnace gas. A description of such an operation is set forth in Applicant's U.S. Pat. No. 3,985,520. In addition to the usual gasification processes which take place within the blast furnace per se, U.S. Pat. No. 3,985,520 also provides for the supplemental production of carbon monoxide and hydrogen by passing oxygen and steam sequentially through the molten pig iron in a separate reaction vessel.

In applicants' U.S. Pat. No. 4,004,895 granted Jan. 25, 1977 a modified form of blast furnace is used for the combustion of coal in a reducing atmosphere in the presence of a fluxing agent to produce a high quality gaseous fuel. During such combustion of the coal, the fluxing agent will combine with the sulfur in the coal to form sulfurous compounds which are removed with the slag along with the ash thereby providing for the clean combustion and gasification of coal.

For years many municipalities have suffered from the problem of refuse disposal and have resorted to numerous schemes including open dumps, landfill operations and incineration. The incineration of municipal refuse has always created a problem due to the large amount of pollution produced by this process. Recent environmental restrictions have forced many cities to shut down their incinerators or to provide them with extremely expensive electrostatic precipitators or other forms of scrubbers to prevent pollution.

Experiments have also been carried out involving the controlled combustion of municipal refuse in a vertical shaft furnace. In such an operation the refuse is the only thing fed to the furnace and is burned along with the introduction of large volumes of pure oxygen at the lower combustion zone. However, such an operation frequently suffers from clogging due to the compaction of the refuse within the furnace and the movement of the refuse burden down through the furnace in combination with the extremely high heat produced by the oxygen supported combustion have caused severe problems with the furnace lining necessitating the frequent replacement thereof. Such a furnace failed to provide the proper support for the refuse burden to control the downward flow and combustion of the refuse. The removal of the ash from the bottom of the furnace has posed additional problems due to the compaction thereof and the need for expensive devices for cleaning the flue gas are still required due to the large amount of fly ash caused by the blast of oxygen through the loose refuse being fed to the furnace.

SUMMARY OF THE INVENTION

The present invention provides a new and improved process for the combustion of municipal refuse in combination with coal and/or coke and a fluxing agent in a blast furnace type environment to produce a fuel quality gaseous effluent. The combustion process is relatively pollution free requiring only minimal cleaning of the gaseous effluent since any sulfur in the coal products as well as the ash resulting from the combustion are captured in the molten slag. The bed of coke within the furnace provides a perfect support for the burden of municipal refuse, coal and coke and limestone to control the downward flow and combustion of the refuse.

The present invention provides a new and improved process for the production of pig iron including the introduction of municipal refuse into a blast furnace along with the conventional coke, limestone and iron ore feed stock.

The present invention provides for the combustion of municipal refuse in the presence of coal and/or coke and a fluxing agent wherein the refuse is subjected to a preheating and compaction treatment to eliminate the volatiles and to compress the remaining loose material into compact pellets or brickettes prior to introduction into the vertical shaft furnace with the coal and/or coke and fluxing agent to reduce the amount of fly ash and to provide for a more even distribution of the refuse with the other feed stock materials.

The present invention provides for a gasification process wherein the steam released from the municipal refuse either during pretreatment or within the furnace is reacted with the coke and/or nascent pig iron within the furnace for the production of synthesis gas or hydrogen to enrich the flue gas from the furnace. If the steam is released in a preheating operation, it can also be directed through molten pig iron in a separate reaction vessel for the production of hydrogen.

The foregoing and other objects and features and advantages of the invention will be apparent from the following more particular description of preferred embodiments of the invention as illustrated in the accompanying drawings.

BRIEF DESCRIPTION OF THE DRAWING

The drawing of the present invention is a schematic flow chart of the process involving the combustion of coal and refuse for the production of a high quality fuel gas.

DETAILED DESCRIPTION OF THE INVENTION

The process according to the present invention can utilize either the coal reactor described in detail in Applicant's U.S. Pat. No. 4,004,895 or the blast furnace described in detail in Applicant's U.S. Pat. No. 3,985,520. Thus, the furnace 10 shown in the drawing could be the furnace disclosed in either of the two foregoing applications. The primary difference between the two furnaces is that the blast furnace would additionally require ore as part of the feed stock for the production of pig iron whereas the coal reactor would not require the addition of ore. The furnace 10 is only shown schematically and the detailed configuration thereof would vary depending upon whether the furnace was merely a coal reactor or a blast furnace. In either event, the furnace would be lined with a refractory material.

Although the municipal refuse could be added directly to the furnace as indicated in the drawing, severe problems would be likely to occur since when pyrolysis sets in, the volatiles will distill out and condense in the upper regions of the furnace where clogging can result from the tarry organic matter. This effect parallels the destructive distillation of coal in the formation of coke and therefore should be done in a separate operation as is the production of coke. Thus the use of raw municipal refuse is generally frowned upon and only under certain conditions and circumstances could the refuse be added directly into the furnace. In addition to the clogging which could occur as a result of the direct introduction of refuse into the furnace, the air blast to the furnace through the conventional tuyeres 12 would tend to unduly agitate the loose municipal refuse thereby causing a high degree of fly ash which would complicate the cleaning process with respect to the flue gases. Finally, in the ordinary average load of refuse collected by a municipality, the moisture content would be very high sometimes even as high as 25% by weight which would complicate the thermalization of the refuse. The enormous quantities of steam which would be driven off would interfere with the production of a dry gaseous fuel and therefore it would be best to resort to a preheating treatment of the refuse prior to adding the same to the furnace 10.

The pretreatment for the refuse in the past has involved sorting and shredding of the feed stock but this represents a repugnant and expensive procedure. A much more beneficial procedure would be to subject the refuse to a preheating operation for the removal of excessive amounts of water and the simultaneous recovery of volatile organic matter for chemical purposes. The pretreatment chamber 20 could be a conventional continuous feed oven followed by a conventional compaction and communition apparatus to reduce the volume and moisture content of the refuse. The compacted residue would then be chopped up into small chunks compatible with the limestone, coal and/or coke being fed to the furnace. The steam itself can be employed for power generation or if the blast furnace operation previously described in Applicant's U.S. Pat. No. 3,985,520 is utilized, the steam can either be fed into the upper levels of the furnace for the production of hydrogen or fed directly into the separate reactor vessel containing the molten pig iron for the production of hydrogen barium. The heating of the refuse material to moderate temperatures below 1000° C. will prove adequate to drive off almost if not all of the volatiles. This could be done gradually to separate the steam from the remaining distillate. The addition of scrap iron to the pretreatment vessel could provide the basis for producing hydrogen, a reaction that proceeds readily for temperatures over 600° C. In a suitable pressurized furnace the entire mass would release an abundance of synthesis gas supported by the reforming reaction of the hydrocarbon with the superheated steam. The formation of iron oxides in the process will help catalyze methanation under properly controlled conditions within the pressurized chamber. A series of investigations would be necessary to work out the details of the reactions most favorable for a whole new realm of fuel technology.

Upon completion of the preheating treatment, the hot mass could readily be compacted, an operation facilitated by the softening of any metals present or by their conversion into frangible products. The densified residue in the form of pellets or brickettes would then be ready for feed stock in the coal reactor and could be combined with coal and/or coke and limestone in the coal reactor of U.S. Pat. No. 4,004,895 or be combined with the coke, ore and limestone in the blast furnace of U.S. Pat. No. 3,985,520.

In the blast furnace of U.S. Pat. No. 3,985,520 as well as in the coal reactor of U.S. Pat. No. 4,004,895, a bed of coke is provided in the base of the furnace below the tuyeres which will support the burden while permitting the liquid slag and metallic products to collect. Both furnaces provide suitable outlets adjacent the bottom of the furnace for drawing off the slag and metallic products. By providing such a coke support in the furnace, the downward flow of the refuse along with the rest of the charge is controlled to provide for the controlled combustion of the refuse at temperatures in the range of 1200° C. - 1500° C. to prolong the life of the lining and to prevent clogging of the furnace. In prior art vertical shaft furnaces where only refuse was introduced into the furnace and burned with an oxygen blast, the extremely high temperatures above 1500° C. and the rapid downward flow of the burden quickly destroyed the furnace lining.

The various flow lines shown in the drawings are in some instances alternative depending upon the type of furnace utilized. As pointed out previously, the refuse would pass through the pretreatment 20 prior to introduction into the furnace 10 or could pass directly into the furnace 10 depending upon the type of refuse involved. Scrap iron could be added to the pretreatment chamber for the production of synthesis gas and/or methanation as pointed out above, or the scrap iron could be added directly to the furnace if the furnace is a blast furnace. The steam produced from the pretreatment can be passed directly to the generator 30 or it can be introduced into the blast furnace 10 or the pig iron reactor 40 if the operation is a blast furnace type of operation involving the reduction of iron ore for the production of pig iron. As indicated in prior U.S. Pat. No. 3,985,520, the resultant iron oxides in the reactor 40 would then be reintroduced into the blast furnace 10. The initial introduction of oxygen into the pig iron reactor would remove the carbon from the pig iron and the resulting carbon monoxide could either be sorted or combined with the blast furnace gas to enrich the fuel gas being supplied to the boiler 50. Likewise, the subsequent introduction of the steam into the pig iron reactor 40 would produce large volumes of hydrogen which could either be stored or also added to the blast furnace gas to enrich the fuel gas being supplied to the boiler.

In either operation, that is using the core reactor or the blast furnace, the slag produced by the fluxing agent, namely limestone, will capture all of the ash from the coal products as well as from the refuse in addition to removing the sulfurous compounds.

While the invention has been more particularly shown and described with reference to preferred embodiments thereof, it is to be understood by those in the art that various changes in form and detail may be made therein without departure from the spirit and scope of the invention.

What is claimed is:

1. A method for the clean combustion of sulfur-bearing coal comprising, introducing a mixture consisting essentially of municipal refuse, said coal and limestone into a substantially closed vertical shaft furnace, burning said coal in the presence of the limestone, decomposing and melting the limestone to provide a slagging action for the removal of ash and sulfur-bearing compounds resulting from said burning, introducing an unheated air blast into the furnace through a plurality of circumferentially spaced tuyeres to define a combustion zone within the furnace adjacent the level of the tuyeres, converting the carbon dioxide produced by the burning of the coal in the combustion zone to carbon monoxide as it passes upwardly through the coal and limestone burden, removing the slag from the bottom of the furnace and removing the gaseous effluent from the top of the furnace which is comprised substantially of nitrogen and carbon monoxide.

2. The process as set forth in claim 1 wherein the temperature of the combustion zone is maintained between 1200° C. and 1500° C.

3. The process as set forth in claim 1 wherein said refuse is subjected to a preheating in a separate vessel external of said vertical shaft furnace at a temperature between 800° C. and 1000° C. to produce steam and compacting the residue prior to introduction into the vertical shaft furnace.

* * * * *